(12) United States Patent
Balasubramanian (10) Patent No.: US 8,266,594 B2
(45) Date of Patent: Sep. 11, 2012

(54) SYSTEM, METHOD AND PROGRAM PRODUCT FOR CORRECTING SEMANTIC ERRORS IN CODE USING PEER SUBMITTED CODE SNIPPETS

(75) Inventor: Swaminathan Balasubramanian, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 12/195,368

(22) Filed: Aug. 20, 2008

(65) Prior Publication Data

US 2010/0050151 A1    Feb. 25, 2010

(51) Int. Cl.
*G06F 9/44* (2006.01)
(52) U.S. Cl. ........................ 717/125; 717/110
(58) Field of Classification Search ............. 717/110, 717/125
See application file for complete search history.

(56) References Cited

U.S. PATENT DOCUMENTS

| | | | |
|---|---|---|---|
| 2004/0003335 A1* | 1/2004 | Gertz et al. | 714/758 |
| 2004/0078785 A1* | 4/2004 | Dutt et al. | 717/136 |
| 2004/0123186 A1 | 6/2004 | Kulp et al. | |
| 2005/0097508 A1* | 5/2005 | Jacovi et al. | 717/103 |
| 2007/0055656 A1* | 3/2007 | Tunstall-Pedoe | 707/3 |
| 2007/0168935 A1 | 7/2007 | Ogami et al. | |
| 2008/0270989 A1 | 10/2008 | Ahadian et al. | |

OTHER PUBLICATIONS

Balasubramanian, S., U.S. Appl. No. 12/195,362, System, Method and Program Product for Guiding Correction of Semantic Errors in Code Using Collaboration Records, filed Aug. 20, 2008.
Balasubramanian, S., U.S. Appl. No. 12/195,373, System, Method and Program Product for Ranking Peer Submitted Code Snippets Using Execution Feedback, filed Aug. 20, 2008.
U.S. Appl. No. 12/195,362—Non-Final Office Action Mailed Nov. 28, 2011.

\* cited by examiner

*Primary Examiner* — Li Zhen
*Assistant Examiner* — Bradford Wheaton
(74) *Attorney, Agent, or Firm* — John R. Pivnichny; Law Office of Jim Boice (57) ABSTRACT

A method, system and program product for correcting semantic errors in code in an integrated development environment. The method includes inputting, using a code editor, code being developed in an integrated development environment, identifying, in a syntax tree constructed for the code inputted, one or more nodes containing semantic errors pertaining to use of a third-party library, choosing a node containing the semantic errors, displaying suggestions for correcting the semantic errors identified for the node chosen, where the suggestions include peer submitted code snippets associated with collaboration records located to correct the semantic errors identified for the node chosen, selecting a code snippet from the code snippets displayed and executing the code inputted in the integrated development environment, such that, the code snippet selected is automatically invoked to correct the semantic errors identified for the node chosen.

24 Claims, 7 Drawing Sheets

FIG. 1

```
1.   Parameter1 firstParamInstance = new Parameter1();
2.   ...
3.   Parameter1 secondParamInstance = new Parameter2();
4.   ...
5.   SomeObject objectInstance = anotherInstance.create();
6.   ...
```

SYSTEM, METHOD AND PROGRAM PRODUCT FOR CORRECTING SEMANTIC ERRORS IN CODE USING PEER SUBMITTED CODE SNIPPETS

FIELD OF THE INVENTION

The present invention relates to computer systems and software, and more specifically to an automated technique for correcting semantic errors in code in an integrated development environment (IDE), using peer submitted code snippets.

BACKGROUND OF THE INVENTION

Most application development activities are managed within an Integrated Development Environment (IDE). Errors in code can be related to syntax, or can also be related to semantics. Code semantic errors can further be related to language semantics, where the code violates the semantics of the underlying language, or semantics related to the use of a third party library. Typically, an IDE provides an editor that is configured to validate code syntax, highlight syntactic errors in a particular language and is configured to offer appropriate corrections for any syntax errors. When the editor identifies a syntax error, matching records are displayed to offer corrections. Often, an IDE provides a rules engine used to highlight language semantic errors, which can be difficult to identify and to correct. As such, there is a need for an application developer to find ways to effectively monitor and correct such semantic errors during development of software.

SUMMARY OF THE INVENTION

In a first aspect, the invention provides a method for correcting semantic errors in code in an integrated development environment. The method includes inputting, using a code editor, code being developed by a developer in an integrated development environment, identifying, in a syntax tree constructed for the code inputted, one or more nodes containing semantic errors pertaining to use of a third-party library, choosing a node of the one or more nodes identified in the syntax tree constructed containing the semantic errors, displaying one or more suggestions for correcting the semantic errors identified for the node chosen, where the one or more suggestions include one or more code snippets associated with one or more collaboration records located for the node chosen and where the one or more code snippets are submitted by peer developers to correct the semantic errors identified for the node chosen, selecting at least one code snippet from the one or more code snippets displayed for correcting the semantic errors identified for the node chosen and executing the code inputted in the integrated development environment, where the at least one code snippet selected is automatically invoked to correct the semantic errors identified for the node chosen. In an embodiment, the identifying step further includes constructing, using a code parser, a syntax tree representation of the code inputted and parsing, by the code parser, the code inputted to identify the one or more nodes containing the semantic errors. In an embodiment, the identifying step further includes the step of providing a collaboration datastore for storing the one or more collaboration records containing respective invocations for identifying the one or more nodes containing the semantic errors, where a collaboration record includes one or more properties and where a respective invocation of the respective invocations includes a type of invocation and one or more parameters. In an embodiment, the identifying step further includes creating, using the one or more collaboration records located, visual indicators within the code editor for the one or more nodes containing the semantic errors identified. In an embodiment, the selecting step further includes providing a code snippet processor for maintaining the one or more code snippets associated with the one or more collaboration records located for the node chosen and configuring one or more parameters for the at least one code snippet selected for the node chosen, where the one or more parameters includes at least one of: input parameters, output parameters, input-output parameters, return values and execution order values. In an embodiment, the executing step further includes ascertaining whether or not the at least one code snippet selected for the node chosen is configured to correct the semantic errors contained within the node, if the at least one code snippet selected for the node is configured to correct the semantic errors contained within the node, fetching the at least one code snippet from the code snippet processor and executing the at least one code snippet fetched based on the type of invocation and the one or more parameters configured for the code snippet selected, where the type of invocation includes an execution order value comprising at least one of: before invocation, after invocation and only upon error. In an embodiment, the method further includes determining whether the execution of the at least one code snippet selected is successful in correcting the semantic errors identified and, if the execution of the at least one code snippet selected is not successful in correcting the semantic errors identified, selecting another code snippet from the one or more code snippets displayed for correcting the semantic errors identified for the node chosen and executing the code inputted in the integrated development environment, where the another code snippet selected is automatically invoked to correct the semantic errors identified for the node chosen.

In another aspect the invention provides a computer system for correcting semantic errors in code in an integrated development environment. The computer system includes a central processing unit, first program instructions to input code being developed in an integrated development environment, the first program instructions including instructions to construct, using a code parser, a syntax tree representation of the code inputted and to parse the code inputted and to identify the one or more nodes containing semantic errors pertaining to use of a third-party library in the code inputted, second program instructions to display, using one or more matching collaboration records located for a node chosen from the one or more nodes identified containing the semantic errors, one or more suggestions for correcting the semantic errors identified in the syntax tree constructed for the code inputted, where the one or more suggestions include one or more code snippets associated with one or more collaboration records located for the node chosen and where the one or more code snippets are submitted by peer developers to correct the semantic errors identified for the node chosen and third program instructions to execute the code inputted in the integrated development environment, where at least one code snippet selected from the one or more code snippets is automatically invoked to correct the semantic errors identified for the node chosen. In an embodiment, the second program instructions include instructions to provide a collaboration datastore for storing one or more collaboration records containing respective invocations for identifying the one or more nodes containing the semantic errors, where a collaboration record includes one or more properties and where a respective invocation of the respective invocations includes a type of invocation and one or more parameters and where the second program instructions include instructions to provide a code snippet processor for maintaining the one or more code snippets associated with the one or more collaboration records located for the node chosen. In an embodiment, the second program instructions include instructions to create semantic error markers within a code editor for identifying the one or more nodes containing the semantic errors. In an embodiment, the third program instructions include instructions to choose the node from the one or more nodes identified containing the semantic errors and to configure one or more parameters for the at least one code snippet selected for the node chosen, where the one or more parameters includes at least one of: input parameters, output parameters, input-output parameters, return values and execution order values. In an embodiment, the third program instructions include instructions to ascertain whether or not the at least one code snippet selected for the node chosen is configured to correct the semantic errors contained within the node and, if the at least one code snippet selected for the node is configured to correct the semantic errors contained within the node, the third program instructions including instructions to fetch the at least one code snippet from the code snippet processor and to execute the at least one code snippet fetched based on the type of invocation and the one or more parameters configured for the code snippet selected, where the type of invocation includes an execution order value comprising at least one of: before invocation, after invocation and only upon error. In an embodiment, the third program instructions include instructions to determine whether the execution of the at least one code snippet selected is successful in correcting the semantic errors identified and, if the execution of the at least one code snippet selected is not successful in correcting the semantic errors identified, the third program instructions including instructions to select another code snippet from the one or more code snippets displayed for correcting the semantic errors identified for the node chosen and to execute the code inputted in the integrated development environment, where the another code snippet selected is automatically invoked to correct the semantic errors identified for the node chosen. In an embodiment, each of the first, second and third program instructions are stored in the computer system for execution by the central processing unit.

In yet another aspect, the invention provides a computer program product for correcting semantic errors in code in an integrated development environment. The computer program product comprises a computer readable medium, first program instructions to input code being developed by a developer in an integrated development environment, the first program instructions including instructions to construct, using a code parser, a syntax tree representation of the code inputted and to parse the code inputted and to identify the one or more nodes containing semantic errors pertaining to use of a third-party library in the code inputted, second program instructions to display, using one or more matching collaboration records located for a node chosen from the one or more nodes identified containing the semantic errors, one or more suggestions for correcting the semantic errors identified in the syntax tree constructed for the code inputted, where the one or more suggestions include one or more code snippets associated with one or more collaboration records located for the node chosen and where the one or more code snippets are submitted by peer developers to correct the semantic errors identified for the node chosen and third program instructions to execute the code inputted in the integrated development environment, where at least one code snippet selected from the one or more code snippets is automatically invoked to correct the semantic errors identified for the node chosen. In an embodiment, the second program instructions include instructions to provide a collaboration datastore for storing one or more collaboration records containing respective invocations for identifying the one or more nodes containing the semantic errors, where a collaboration record includes one or more properties and where a respective invocation of the respective invocations includes a type of invocation and one or more parameters and where the second program instructions include instructions to provide a code snippet processor for maintaining the one or more code snippets associated with the one or more collaboration records located for the node chosen. In an embodiment, the second program instructions include instructions to create semantic error markers within a code editor for the semantic errors identified using the one or more collaboration records located, the second program instructions including instructions to create, using the one or more collaboration records located, visual indicators within the code editor for the one or more nodes containing the semantic errors identified. In an embodiment, the third program instructions include instructions to choose the node from the one or more nodes identified containing the semantic errors and to configure one or more parameters for the at least one code snippet selected for the node chosen, where the one or more parameters includes at least one of: input parameters, output parameters, input-output parameters, return values and execution order values. In an embodiment, the third program instructions include instructions to ascertain whether or not the at least one code snippet selected for the node chosen is configured to correct the semantic errors contained within the node and, if the at least one code snippet selected for the node is configured to correct the semantic errors contained within the node, the third program instructions include instructions to fetch the at least one code snippet from the code snippet processor and to execute the at least one code snippet fetched based on the type of invocation and the one or more parameters configured for the code snippet selected, where the type of invocation includes an execution order value comprising at least one of: before invocation, after invocation and only upon error. In an embodiment, the third program instructions include instructions to determine whether the execution of the at least one code snippet selected is successful in correcting the semantic errors identified and, if the execution of the at least one code snippet selected is not successful in correcting the semantic errors identified, the third program instructions including instructions to select another code snippet from the one or more code snippets displayed for correcting the semantic errors identified for the node chosen and to execute the code inputted in the integrated development environment, where the another code snippet selected is automatically invoked to correct the semantic errors identified for the node chosen. In an embodiment, each of the first, second and third program instructions are recorded on the computer readable medium.

Further, in yet another aspect, the invention provides a process for deploying computing infrastructure including integrating computer-readable code into a computing system, where the code in combination with the computing system is capable of performing a process of correcting semantic errors in code in an integrated development environment, the process includes inputting, using a code editor, code being developed by a developer in an integrated development environment, constructing, using a code parser, a syntax tree representation of the code inputted, identifying, in the syntax tree constructed for the code inputted, one or more nodes containing semantic errors pertaining to use of a third-party library, choosing a node of the one or more nodes identified in the syntax tree constructed containing the semantic errors, displaying one or more suggestions for correcting the semantic errors identified for the node chosen, where the one or more suggestions include one or more code snippets associated with one or more collaboration records located for the node chosen and where the one or more code snippets are submitted by peer developers to correct the semantic errors identified for the node chosen, selecting at least one code snippet from the one or more code snippets displayed for correcting the semantic errors identified for the node chosen and executing the code inputted in the integrated development environment, where the at least one code snippet selected is automatically invoked to correct the semantic errors identified for the node chosen. The process further includes providing a collaboration datastore for storing the one or more collaboration records containing respective invocations for identifying the one or more nodes containing the semantic errors, where a collaboration record includes one or more properties and where a respective invocation of the respective invocations includes a type of invocation and one or more parameters. In an embodiment, the identifying step further includes creating, using the one or more collaboration records located, visual indicators within the code editor for the one or more nodes containing the semantic errors identified. In an embodiment, the displaying step further includes ascertaining whether or not the developer wishes to apply a suggestion of the one or more suggestions displayed for the node and, if the developer wishes to apply the suggestion of the one or more suggestions displayed for the node, applying the suggestion to the node to correct the semantic errors identified. In an embodiment, the identifying step further includes ascertaining whether or not the at least one code snippet selected for the node chosen is configured to correct the semantic errors contained within the node, if the at least one code snippet selected for the node is configured to correct the semantic errors contained within the node, fetching the at least one code snippet from the code snippet processor and executing the at least one code snippet fetched based on the type of invocation and the one or more parameters configured for the code snippet selected, where the type of invocation includes an execution order value comprising at least one of: before invocation, after invocation and only upon error. In an embodiment, the executing step further includes determining whether the execution of the at least one code snippet selected is successful in correcting the semantic errors identified, if the execution of the at least one code snippet selected is not successful in correcting the semantic errors identified, selecting another code snippet from the one or more code snippets displayed for correcting the semantic errors identified for the node chosen and executing the code inputted in the integrated development environment, where the another code snippet selected is automatically invoked to correct the semantic errors identified for the node chosen.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Many of the functional units described in this specification have been referred to as modules or components, in order to more particularly emphasize their implementation independence. A module may be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and over disparate memory devices. Furthermore, modules may also be implemented as a combination of software and one or more hardware devices. For instance, a module may be embodied in the combination of a software executable code stored on a memory device. In a further example, a module may be the combination of a processor that operates on a set of operational data.

Figure 1:
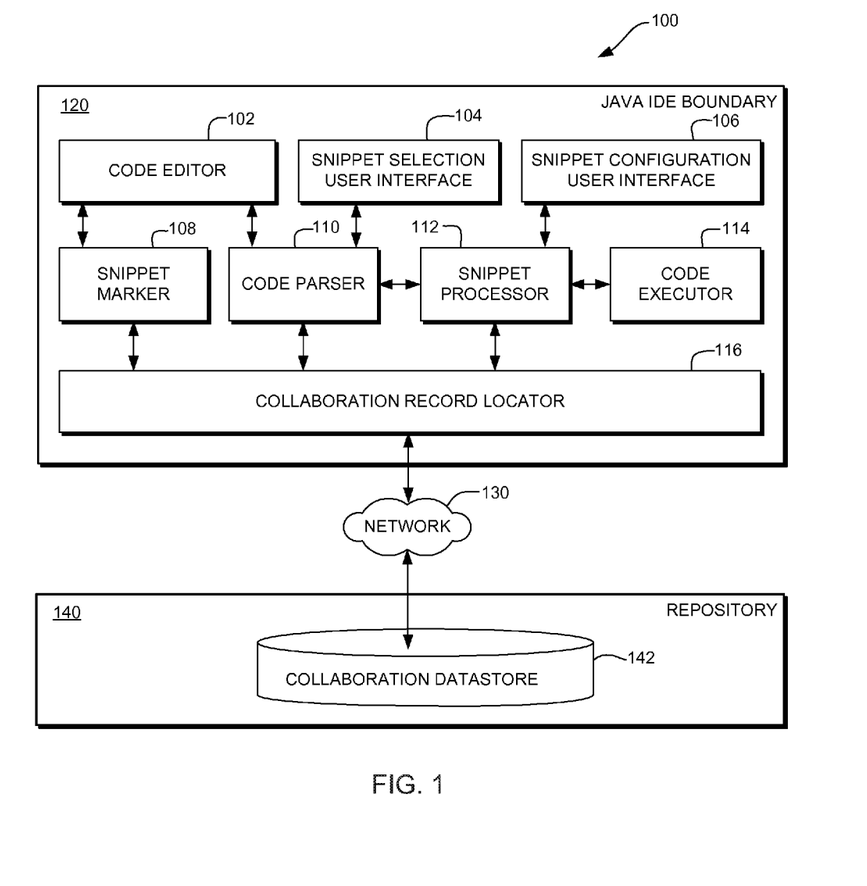
FIG. 1 is a schematic block diagram of a Java integrated development environment (IDE) for correcting semantic errors identified in code, using peer submitted code snippets, in accordance with an embodiment of the present invention.

Reference is now made to FIG. 1, which illustrates an embodiment of a computer infrastructure 100 for correcting semantic errors in code in an integrated development environment (IDE), using one or more peer submitted code snippets, in accordance with an embodiment of the invention. Turning to FIG. 1, FIG. 1 depicts a schematic block system diagram illustrating one embodiment of a computer infrastructure 100, which illustrates an integrated development environment (IDE) for correcting semantic errors due to use of third party libraries in the code, using code snippets submitted by peer developers. In an embodiment, the integrated development environment (IDE) boundary 120 comprises an IDE software application that comprises one or more program modules or program components for correcting semantic errors in code being developed, using code snippets submitted by peer developers. In an embodiment, the IDE software application includes one or more code editors that an application developer may use to write code in a specific programming language. Besides providing a convenient interface to view and modify code, a code editor is able to validate code syntax, highlight syntactic errors and offer corrections. In an embodiment, as shown in FIG. 1, the integrated development environment (IDE) boundary 120 comprises a Java integrated development environment (IDE) 120 for correcting semantic errors found in Java code being developed, using peer submitted code snippets for the Java programming language. A semantic error occurs when code violates the semantics of the underlying language or violates use of a third-party library. As depicted in FIG. 1, the Java integrated development environment (IDE) boundary 120 includes a code editor component 102 (simply referred to herein after as "code editor"), a snippet selection user interface component 104 (simply referred to herein after as "snippet selection user interface"), a snippet configuration user interface component 106 (simply referred to herein after as "snippet configuration user interface"), a snippet marker component 108 (simply referred to herein after as "snippet selection user interface"), a code parser component 110 (simply referred to herein after as "code parser"), a snippet processor component 112 (simply referred to herein after as "snippet processor"), a code executor component 114 (simply referred to herein after as "code executor") and a collaboration record locator component 116 (simply referred to herein after as "collaboration record locator"). The code editor 102 is used by a programmer or developer to input or enter code. As a developer enters code into the code editor 102, the code parser 110 reads and parses the entered code. Further, the code parser 110 constructs an Abstract Syntax Tree (AST) representation of the code inputted in the code editor 102. Using the collaboration record locator 116, the code parser 110 identifies all semantic errors in the use of third party libraries in the entered or inputted code. In an embodiment, the collaboration record locator 116 uses the AST constructed by the code parser 110 to locate one or more collaboration records stored or maintained in a collaboration datastore 142 within a repository 140. In an embodiment, the collaboration datastore 142 is located in a remote repository 140 and is accessed over a network 130. However, it is understood that the collaboration datastore 142 may be located in a local repository within integrated development environment (IDE) 120, where each developer may have access to their own local datastore, and where the datastores may be configured to update each other via replication. Further, in an embodiment, the collaboration record locator 116 returns the collaboration records retrieved from the collaboration datastore 142 to the snippet marker 108. The snippet marker 108 creates visual indicators in the code editor 102 for lines of code identified with semantic errors for which code snippets exist. The developer uses the snippet selection user interface 104 to view and select existing code snippets. Additionally, the developer uses snippet configuration user interface 106 to configure selected code snippets. The code snippet selections and code snippet configurations, and the location of the actual code snippets are maintained by the snippet processor 112. Further, in an embodiment, the code executor 114 runs the code entered by the developer in the IDE 120 and uses snippet processor 112 to invoke one or more code snippets selected to correct the semantic errors found in the inputted code. As shown in FIG. 1, the system 100 which includes a Java integrated development environment (IDE) boundary 120 is intended to represent any type of computer architecture that is maintained in a secure environment (i.e., for which access control is enforced). It should be understood, however, that although not shown, other hardware and software components (e.g., compiler, debugger, additional computer systems, routers, firewalls, etc.) could be included in system 100. Also, it will be understood by one skilled in the art that the invention may be used in conjunction with other programming languages for correcting semantic errors in code due to use of third party libraries, using code snippets.

Figure 2:
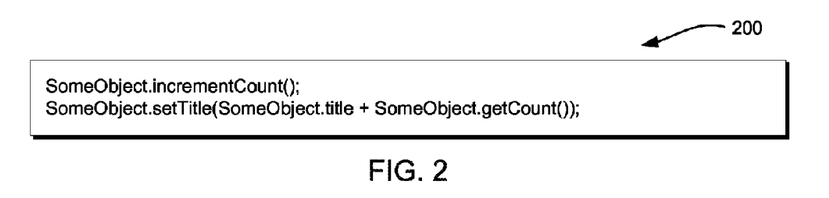
FIG. 2 depicts an example of a code snippet comprising of a set of lines of code for correcting semantic errors identified in code inputted in an integrated development environment (IDE), in accordance with an embodiment of the present invention.

Reference is now made to FIG. 2, reference numeral 200, which illustrates an example of a code snippet for correcting a semantic error identified in code that is being developed by a peer developer, in accordance with an embodiment of the invention. As shown in FIG. 2, a code snippet is a piece of code that runs within an execution context and meaningfully alters some aspect of that execution. In an embodiment, as shown in FIG. 2, a code snippet comprises a set of lines of code submitted by a peer to correct a semantic error in the developer's use of a third-party library. In an embodiment, when a node is identified in the abstract syntax tree (AST) as containing a semantic error pertaining to use of third-party library, a matching collaboration record is located for that identified node in the AST. In an embodiment, the collaboration record matching the identified node contains one or more suggestions for correcting the semantic error in the identified node, where some suggestions contain code snippets submitted by peer developers. In an alternate embodiment, a collaboration record itself may contain one or more code snippets. Further, in an embodiment, each submitted code snippet has a property (referred to herein as "execution property") that specifies when the code snippet should be executed. In an embodiment, the execution property specifying when the code snippet should be executed includes an execution order value comprising at least one of: before invocation, after invocation or only upon error and, preferably, is selected from the execution order value group consisting essentially of before invocation, after invocation or only upon error. In particular, if the property specifies that the code snippet should be executed "before invocation", then the code snippet is executed before the node in the AST is called. On the other hand, if the property specifies that the code snippet should be executed "after invocation", then the code snippet is executed after the node in the AST is called. Similarly, if the property specifies that the code snippet should be executed "only upon error", then the code snippet is executed only if executing the node results in a specific set of errors. In an embodiment, this execution property is configured by the peer developer submitting the code snippet, as discussed further herein below with respect to FIG. 6. Upon execution of the developer's code, the peer submitted code snippet is invoked according to the execution property described herein above.

Figure 3:
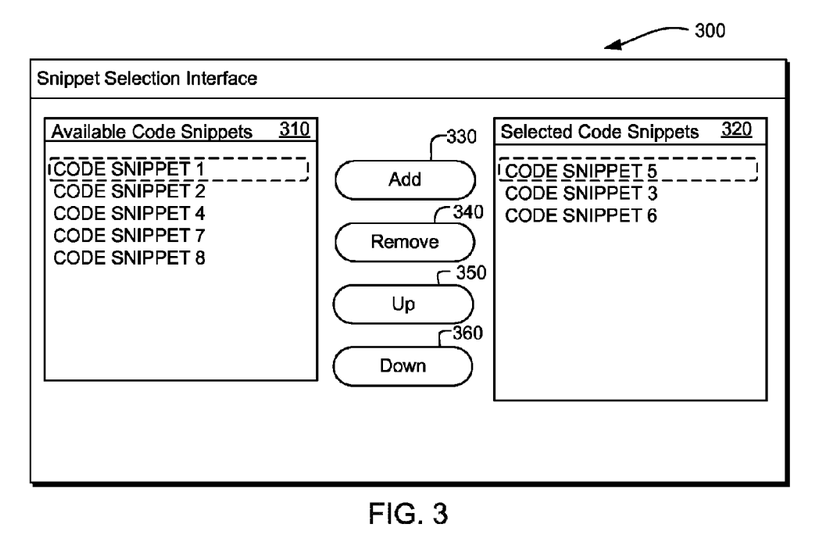
FIG. 3 depicts an illustration of a code snippet selection interface for selecting one or more code snippets for correcting semantic errors in code inputted into a code editor in an integrated development environment (IDE), in accordance with an embodiment of the present invention.

Turning to FIG. 3, reference numeral 300 illustrates a code snippet selection interface for selecting one or more code snippets for correcting semantic errors in code inputted into a code editor in an integrated development environment (IDE), in accordance with an embodiment of the invention. In an embodiment, the IDE collects all such code snippets associated with the collaboration record and presents the available code snippets to the developer. The developer may select one code snippet to use. Alternately, the developer may select multiple code snippets, where one code snippet is designated as primary and selected by default for execution. If the code executor encounters an error, then execution switches to using a second code snippet. This process is repeated until either the execution of one selected code snippet is successful or all selected code snippets have been executed, but with errors. As shown in FIG. 3, the snippet selection interface 300 displays to a developer a list of all available code snippets 310 corresponding to a node identified as containing a semantic error. In particular, the snippet selection interface displays, on a display, the available code snippets (reference numeral 310) that a developer can choose from. In an embodiment, the developer highlights an available code snippet from the Available Code Snippets list 310 and clicks on the add button (reference numeral 330) to add the highlighted code snippet among the one or more of the available code snippets 310 listed in FIG. 3 to the Selected Code Snippets list 320. As shown under "Selected Code Snippets" (Reference numeral 320) in FIG. 3, the developer has already selected code snippets 5, 3 and 8 for correcting a semantic error in code under development. Further, as shown under "Available Code Snippets" (reference numeral 310), there are still some other code snippets that are available for the developer to choose from, namely, code snippet 1, 2, 4, 7 and 8. In an embodiment, the developer highlights a selected code snippet listed under "Selected Code Snippets" (reference numeral 320) and then clicks on the remove button (reference numeral 340) to remove a previously added code snippet from the list of selected code snippets 320. Further, the developer uses the up button (reference numeral 350) and/or the down button (reference numeral 360) to specify the order of selection for execution of the list of selected code snippets 320. As such, the code executor executes code snippet 5 first. If the code executor encounters an error executing code snippet 5, then execution switches to using the next code snippet in the list 320, namely, code snippet 3. Similarly, if the code executor encounters an error executing code snippet 3, then execution switches to using the next code snippet in the list 320, namely, code snippet 6. This process is repeated until either the execution of a selected code snippet is successful or all three selected code snippets (shown in list 320 of FIG. 3) have been executed, but with errors.

Figure 4:
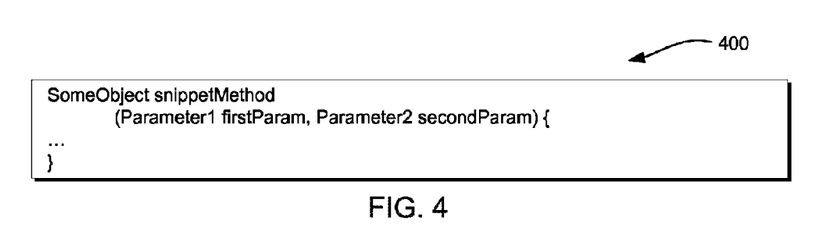
FIG. 4 depicts an example of a code snippet submitted by a peer developer comprising of a method with two parameters and a return value for correcting a semantic error identified in the code inputted into an integrated development environment (IDE), in accordance with an embodiment of the present invention.
Figure 5:
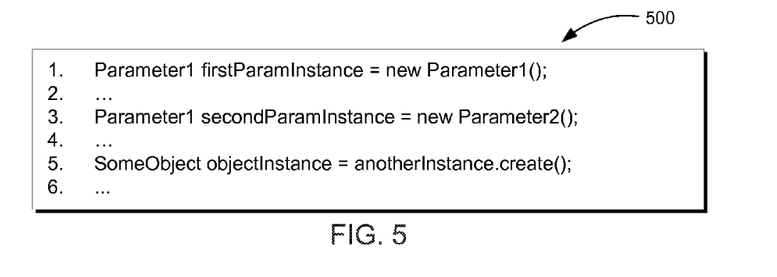
FIG. 5 depicts an example of a code being developed by a developer that contains an invocation for executing a code snippet, such that, the code snippet is invoked according to the property described in the invocation, in accordance with an embodiment of the present invention.

Reference is now made to FIGS. 4 and 5, which together illustrate an embodiment of using a code snippet to correct a semantic error identified in code inputted into a code editor in an integrated development environment (IDE), in accordance with an embodiment of the invention. In particular, as shown in FIG. 4, the code snippet 400 submitted by a peer developer comprises a method with two parameters and a return value, where the IDE allows the developer to configure the method. Further, the code snippet 400 is associated with the invocation in line 5 of FIG. 5, reference numeral 500, which shows an example of code being developed by a developer. In particular, the code snippet 400 is configured to correct the semantic error identified in the code being developed, using the code snippet. It is understood by one skilled in the art that a code snippet may also be a class with one or more methods, where a predefined method with parameters and a return value is always invoked.

Figure 6:
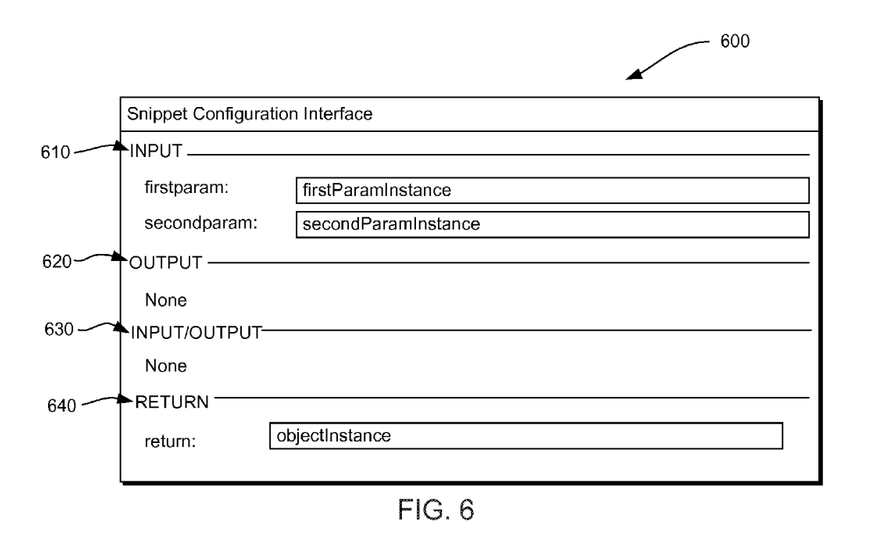
FIG. 6 depicts an illustration of a code snippet configuration interface for configuring one or more code snippets for correcting semantic errors in code inputted into a code editor in an integrated development environment (IDE), in accordance with an embodiment of the present invention.

Reference is now made to FIG. 6, reference numeral 600, which illustrates a code snippet configuration interface for configuring one or more code snippets available for correcting semantic errors in code being developed by a developer in an integrated development environment, in accordance with an embodiment of the invention. Upon execution of the developer's code 500, shown in FIG. 5, the peer submitted code snippet is invoked according to the execution property specified in the code snippet, such as, before invocation, after invocation or only upon error. In an embodiment, the developer code with its dependencies and the code snippet with its dependencies are compiled independent of each other. During execution, the code executor uses information contained in the snippet processor to determine when the code snippet needs to be invoked. In particular, the code executor merges the code snippet with the executing code in one of three ways. First, the code snippet is "in lined" with the developer code, such that, the code snippet and the developer code are part of a single frame (or method invocation). Second, the code snippet is maintained in a separate method, such that, the method is invoked from the developer code's frame resulting in the code snippet being executed within its own frame. Third, the code snippet is contained within a class whose instance is invoked and managed by the code executor during execution. As shown in FIG. 6, a snippet configuration interface (reference numeral 600) is used to configure a code snippet. The configuration may contain input parameter configuration (reference numeral 610) used to configure any input parameters used by the code snippet; output parameter configuration (reference numeral 620) used to configure any output parameters that are created in the developer code and passed into the code snippet; input/output parameter configuration (reference numeral 630) used to configure any parameters that are created in the developer code and passed into the code snippet, where they are modified; and return parameter configuration (reference numeral 640) that are created in the code snippet and returned to the developer code. Referring to FIG. 6, a developer first configures any input parameters (reference numeral 610), such as, "firstParamInstance" and "secondParamInstance". Further, a developer configures any output parameters (reference numeral 620), which in this example shows no output parameters. Furthermore, the developer configures any input/output parameters (reference numeral 630), which in this example shows that no input/output parameters have been configured. Finally, the developer configures any return values (reference numeral 640), such as, "objectInstance".

Figure 7:
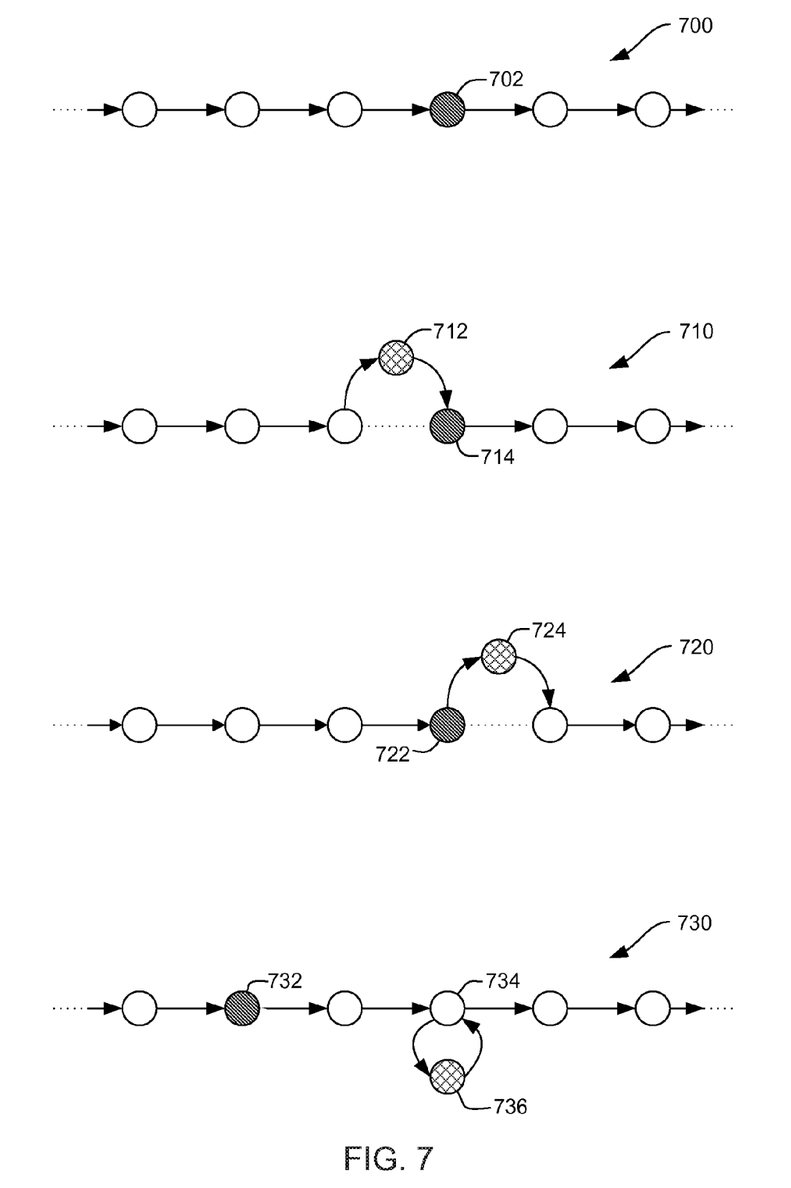
FIG. 7 is a schematic block system diagram depicting various ways in which a code snippet may be configured to be invoked by an invocation for correcting semantic errors in code being developed by a developer, in accordance with an embodiment of the present invention.

Turning to FIG. 7, reference numerals 700, 710, 720 and 730 represent execution flows, with each illustrating various ways in which a code snippet may be configured to be invoked for correcting semantic errors in code being developed by a developer, in accordance with embodiments of the present invention. In an embodiment, as shown in FIG. 7, each circle represents a node in an execution flow, where a darker shade circle represents a node having a semantic error and where a checkered circle represents a code snippet. In an object oriented language, such as, Java, a node represents a message sent by one object to another object. More generally, a node is an abstraction for a set of lines of code. Turning to the schematic for execution flow 700, circle 702 represents a node that contains a semantic error. Further, as shown in the schematic for execution flow 710, code snippet 712 is configured to be invoked before execution of a node 714, which contains a semantic error. On the other hand, as shown in the schematic for execution flow 720, code snippet 724 is configured to be invoked after execution of node 722, which contains a semantic error. Moreover, the schematic for execution flow 730 shows that code snippet 736 is configured to be invoked only in case of an error. In particular, as shown in the schematic for execution flow 730, node 732 contains a semantic error, but the error in execution as a consequence of the semantic error occurs later at node 734. As such, code snippet 736 is executed and the execution flow returns to execute node 734 again.

Figure 8A:
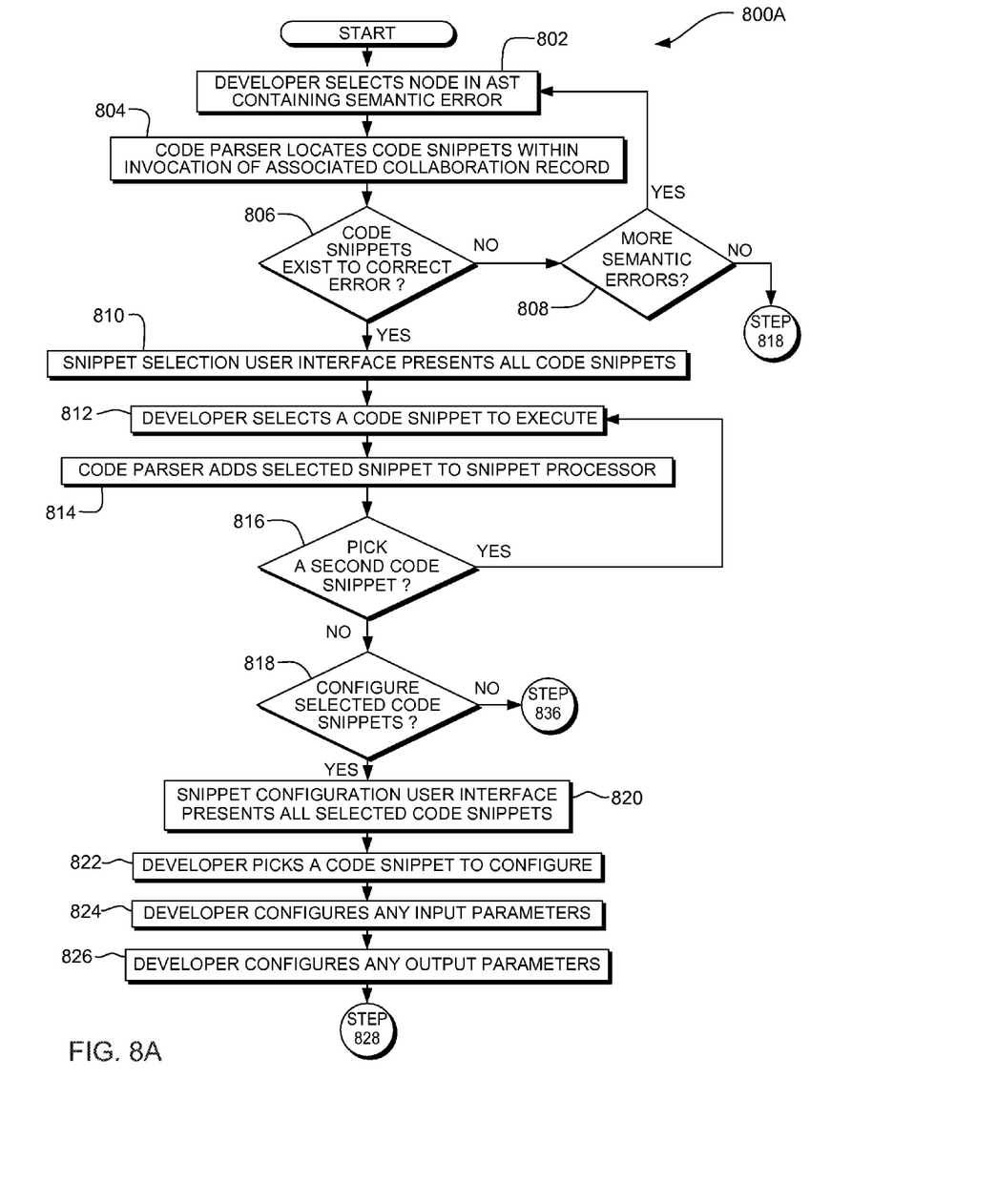
FIGS. 8A and 8B together depict a flowchart outlining the steps performed for correcting semantic errors in code, using peer submitted code snippets, in accordance with an embodiment of the present invention.
Figure 8B:
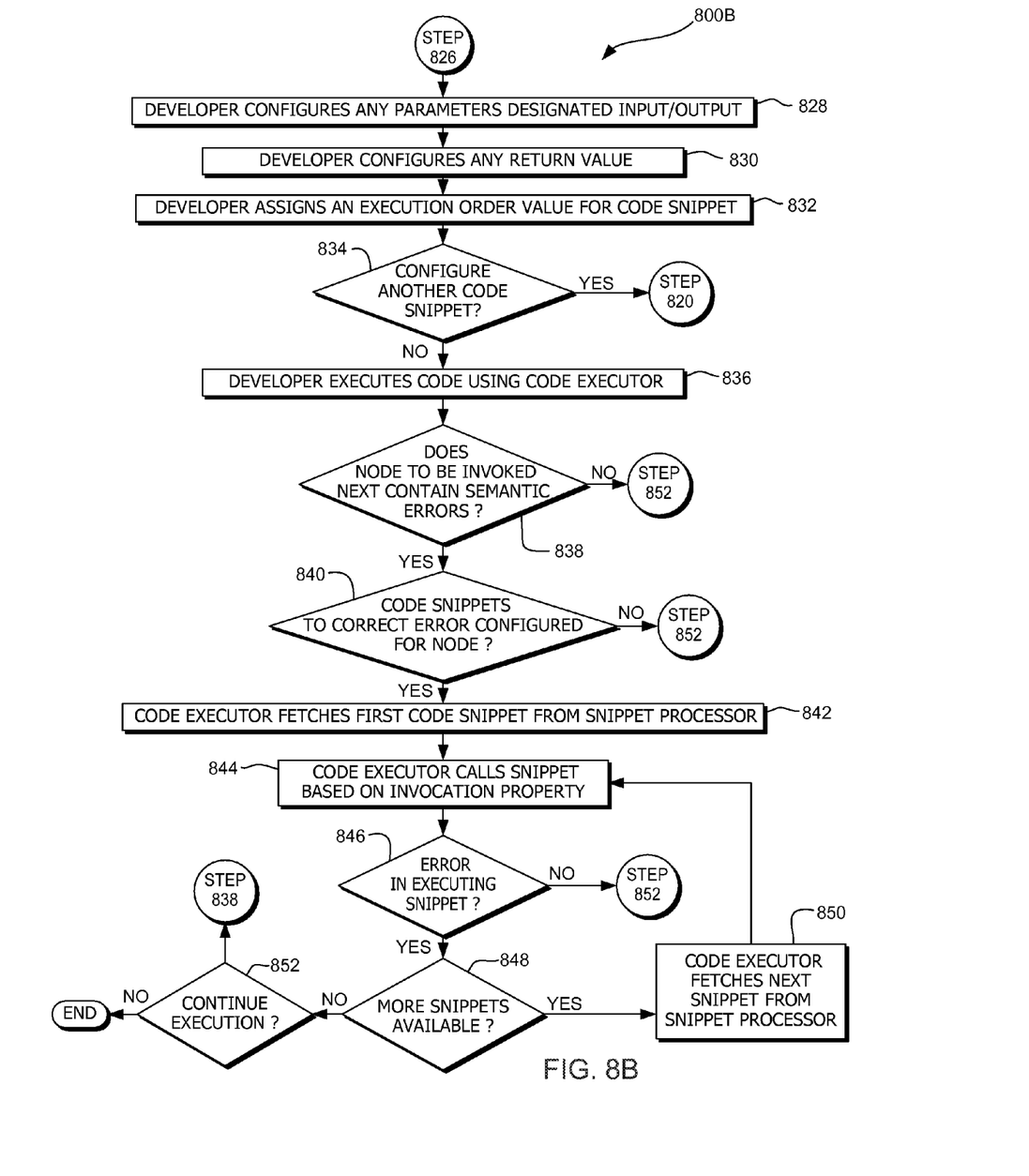

In another embodiment, the invention provides a method for correcting semantic errors in an integrated development environment (IDE), using one or more code snippets, in accordance with an embodiment of the present invention. Further, in yet another embodiment, the invention provides a process for deploying computing infrastructure including integrating computer-readable code into a computing system, wherein the code in combination with the computing system is capable of performing a process of correcting semantic errors in code in an integrated development environment. Reference is now made to FIGS. 8A and 8B, respective flowcharts 800A and 800B, which together outline a method for correcting semantic errors in an integrated development environment (IDE), using one or more code snippets. The method begins in 800A with a developer selecting in step 802 a node in the constructed abstract syntax tree (AST) representation of the code within an integrated development environment (IDE), which contains a semantic error. In step 804, the code parser locates code snippets within an invocation of an associated collaboration record. The code parser further determines in step 806 whether or not code snippets exist to correct the semantic error identified in the node. If the code parser determines that code snippets do not exist to correct the semantic error in the node, then, the code editor determines if additional semantic errors exist in step 808. If the code parser determines that additional semantic errors do not exist in step 808, then the process continues with step 818 in FIG. 8A. However, if the code parser determines that additional semantic error do exist, then the process returns to step 802, where the developer selects a node in the AST containing a semantic error. Going back to step 806, if the code parser determines that code snippets do exist to correct the semantic error, then in step 810, the snippet selection user interface presents all code snippets. In step 812, the developer selects a code snippet to execute. The code parser adds in step 814 the selected code snippet to the snippet processor. Further, in step 816, the code editor determines whether or not the developer wishes to pick or select a second code snippet. If the code editor determines that the developer wishes to pick a second code snippet, then the process returns to step 812, where the developer selects a second code snippet to execute. If the code editor determines that the developer does not wish to pick a second code snippet, then the code editor determines in step 818 whether or not the developer wishes to configure the selected code snippets. If the developer does not wish to configure the selected code snippets in step 818, then the process continues with step 836 in FIG. 8B. However, if the developer wishes to configure the selected code snippets in step 818, then in step 820, the snippet configuration user interface presents all selected code snippets to the developer. Further, the developer picks a code snippet to configure in step 822. The developer configures any input parameters in step 824 and configures any output parameters in step 826. The process continues with step 828 in FIG. 8B. In step 828 of FIG. 8B, the developer configures any parameters designated input/output parameters. Further, the developer configures any return value in step 830. In step 832, the developer assigns an execution order value for the code snippets selected. Further, in step 834, a determination is made as to whether or not the developer wishes to configure another code snippet. If the developer wishes to configure another code snippet, the process continues with step 820 in FIG. 8A. If the developer does not wish to configure another code snippet in step 834, then the developer executes, in step 836, the code using the code executor in the integrated development environment. Next, in step 838, the code editor determines whether or not the node to be invoked next contains any semantic error. If it is determined that the node to be invoked next does not contain any semantic errors, then the process continues with step 852 in FIG. 8B. However, if the code editor determines that the node to be invoked next does contain semantic errors, then the process continues with step 840, where the code editor determines whether or not the code snippets selected to correct a semantic error are configured for a selected node. If the code snippets selected to correct a semantic error are determined not to be configured for a selected node, then the process continues with step 852 in FIG. 8B. However, if the code snippets selected to correct a semantic error are determined to be configured for a selected node in step 840, then the code executor fetches the first code snippet selected from the snippet processor in step 842. In step 844, the code executor calls a code snippet based on the invocation property in the code snippet. In step 846, the code executor determines whether or not an error is detected in executing the code snippet. If no errors are detected in step 846, then the process continues with step 852 in FIG. 8B. However, if errors are detected in step 846, then the code editor determines whether or not more code snippets are available in step 848. If it is determined that more code snippets are available, then the code executor fetches the next snippet from the snippet processor in step 850 and the process returns to step 844, where the code executor calls the code snippet based on invocation property. However, if it is determined in step 848 that more code snippets are not available, then the code executor determines in step 852 whether or not the developer wishes to continue execution of the code. If the developer wishes to continue execution of the code in step 852, then the process returns to step 838, where the code executor determines whether or not the next node to be invoked contains any semantic errors. If the developer does not wish to continue execution of the code in step 852, the process ends.

Figure 9:
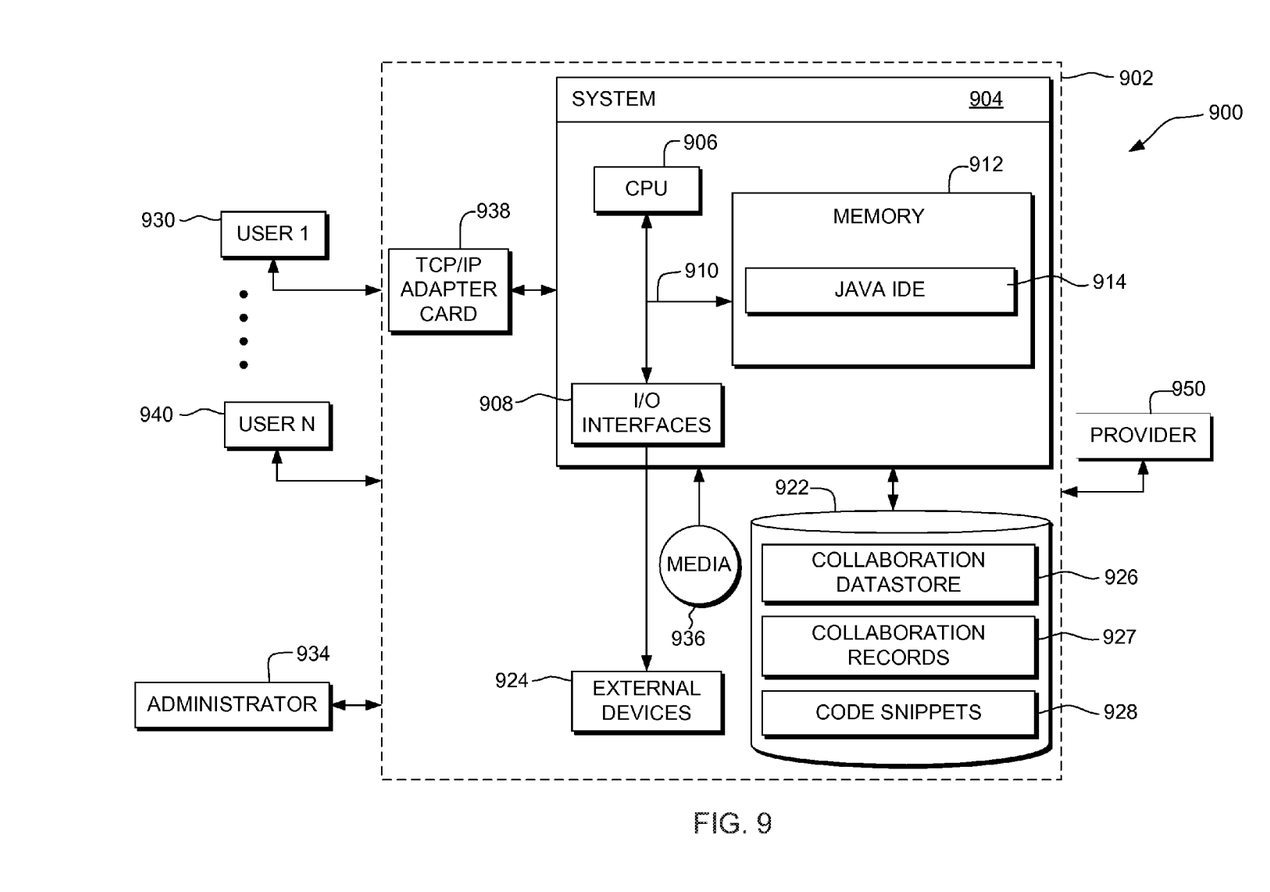
FIG. 9 is a schematic block system diagram of an integrated development environment (IDE), such as, a Java IDE for correcting semantic errors in code, using code snippets, in accordance with an embodiment of the present invention.

Referring now to FIG. 9, there is illustrated a computer system 900 that includes a computer infrastructure 902 having a computer program product configured to correct semantic errors identified in a section of code under development, using code snippets, in accordance with an embodiment of the invention. The computer program product comprises a computer readable or computer-usable storage medium, which provides program code, such as, the Java integrated development environment (IDE) application 914 for correcting semantic errors identified in a section of Java code under development. The Java integrated development environment (IDE) application 914 can be loaded into computer system 904 from a type of computer readable media 936, such as, a magnetic tape or disk, optical media, DVD, memory stick, semiconductor memory, etc. or downloaded from the Internet via a TCP/IP adapter card 938. As depicted in FIG. 9, system 900 includes a computer infrastructure 902, which is intended to represent any type of computer architecture that is maintained in a secure environment (i.e., for which access control is enforced). As shown, infrastructure 902 includes a computer system 904 that typically represents an application server or system 904 or the like that includes a integrated development environment (IDE) for developing software, such as the Java integrated development environment (IDE) 914 configured to correct semantic errors in code under development, using peer submitted code snippets. It should be understood, however, that although not shown, other hardware and software components (e.g., additional computer systems, routers, firewalls, etc.) could be included in infrastructure 902.

In general, user 1 (reference numeral 930) through user N (reference numeral 940) may access the computer system 904, which has deployed thereon the Java integrated development environment (IDE) application 914, which implements the invention. As shown in FIG. 9, the system 904 (which has implemented thereon the Java integrated development environment (IDE) application 914) is shown to include a storage system or repository 922. In an embodiment, the storage system 922, stores a collaboration datastore 926 that has stored therein one or more collaboration records 927 used for correcting semantic errors in code under development, using peer submitted code snippets. Further, the storage system 922 stores one or more code snippets 928 used for correcting semantic errors identified in code being developed. In particular, a developer or programmer (user 1, reference numeral 930 through user N, reference numeral 940) accesses the Java integrated development environment (IDE) application 914 running on system 904 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 902 could occur via a direct hardwired connection (e.g., serial port), or via an addressable connection that may utilize any combination of wired line and/or wireless transmission methods. Moreover, conventional network connectivity, such as Token Ring, Ethernet, Wi-Fi (Wireless Fidelity) or other conventional communications standards could be used. Still yet, connectivity could be provided by conventional TCP/IP sockets-based protocol. In this instance, the parties could utilize an Internet service provider to establish connectivity to infrastructure 902. It should be understood that under the present invention, infrastructure 902 could be owned and/or operated by a party such as a third party provider 950, or by an independent entity. Regardless, use of infrastructure 902 and the teachings described herein could be offered to the parties on a subscription or fee-basis. In either scenario, an administrator 934 could support and configure infrastructure 902, for instance, upgrading the Java IDE application 914 deployed on the computer system 904.

The computer system 904 is shown to include a CPU (hereinafter "processing unit 906"), a memory 912, a bus 910, and input/output (I/O) interfaces 908. Further, the computer system 904 is shown in communication with external I/O devices/resources 924 and storage system 922. In general, processing unit 906 executes computer program code, such as the Java integrated development environment (IDE) application 914 for correcting semantic errors within code being developed, using code snippets. While executing computer program code, the processing unit 906 can read and/or write data to/from memory 912, storage system 922, and/or I/O interfaces 908. For instance, in one embodiment, the Java integrated development environment (IDE) application 914 stores the code snippets 928 within storage 922. Alternatively, the data stored in storage 922 may be stored in a separate storage within the system 904. Bus 910 provides a communication link between each of the components in computer system 900, such that information can be communicated within the infrastructure 902. External devices 924 can comprise any devices (e.g., keyboard, pointing device, display, etc.) that enable a user (developer or programmer) to interact with computer system 900 and/or any devices (e.g., network card, modem, etc.) that enable server 904 to communicate with one or more other computing devices.

Computer infrastructure 902 is only illustrative of various types of computer infrastructures for implementing the invention. For example, in an embodiment shown, computer infrastructure 902 comprises two or more computing devices (e.g., a server cluster) that communicate over a network to perform the various process steps of the invention. Moreover, computer system 900 is only representative of various possible computer systems that can include numerous combinations of hardware. To this extent, in other embodiments, computer system 900 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 906 may comprise a single processing unit, or be distributed across one or more processing units in one or more locations, e.g., on a client and server. Similarly, memory 912 and/or storage system 922 can comprise any combination of various types of data storage and/or transmission media that reside at one or more physical locations. Further, I/O interfaces 908 can comprise any system for exchanging information with one or more external devices 924. Still further, it is understood that one or more additional components (e.g., system software, math co-processing unit, etc.) not shown in FIG. 9 can be included in computer system 900. However, if computer system 900 comprises a handheld device or the like, it is understood that one or more external devices 924 (e.g., a display) and/or storage system(s) 922 could be contained within computer system 904, and not externally as shown. Storage system 922 can be any type of system (e.g., a database) capable of providing storage for information under the present invention, such as the peer submitted code snippets 928, stored in the collaboration datastore 926. To this extent, storage system 922 could include one or more storage devices, such as a magnetic disk drive or an optical disk drive. In another embodiment, storage system 922 includes data distributed across, for example, a local area network (LAN), wide area network (WAN) or a storage area network (SAN) (not shown). Although not shown, additional components, such as cache memory, communication systems, system software, etc., may be incorporated into computer system 900.

Accordingly, the invention provides a system, method, computer program product and a process for correcting semantic errors in the use of third-party libraries by using peer submitted code snippets to correct the semantic errors. A developer working with code in a code editor selects a node in the AST representation of the code identified as containing semantic errors. From a matching invocation of the associated collaboration record, the IDE presents an available set of code snippets submitted by peer developers to correct the semantic error. The developer selects and configures one or more snippets. When the code is executed, the selected code snippet is automatically invoked to correct the error.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for correcting semantic errors in code in an integrated development environment, said method comprising:
inputting, using a code editor, code being developed in an integrated development environment;
identifying, in a syntax tree constructed for said code inputted, one or more nodes containing semantic errors pertaining to use of a third-party library;
choosing a node of said one or more nodes identified in said syntax tree constructed containing said semantic errors;
displaying multiple suggestions for correcting said semantic errors identified for said node chosen, wherein each of said multiple suggestions include one or more executable code snippets associated with one or more collaboration records located for said node chosen, and wherein said one or more executable code snippets are submitted by peer developers to correct said semantic errors identified for said node chosen;
displaying an executable code snippet configuration interface for configuring said one or more executable code snippets, wherein the executable code snippet configuration interface comprises:
an input parameter active field for identifying input parameters that are required, by said node chosen, to be used with said one or more executable code snippets;
an output parameter active field for identifying output parameters that are required, by said node chosen, to be used with said one or more executable code snippets;
an input/output parameter active field for identifying input/output parameters that are required, by said node chosen, to be used with said one or more executable code snippets; and
a return value active field for identifying a return value that is required, by said node chosen, to be returned by said one or more executable code snippets;
selecting at least one executable code snippet from said one or more executable code snippets displayed for correcting said semantic errors identified for said node chosen; and
executing said code inputted in said integrated development environment, wherein said at least one executable code snippet has been previously collected by said integrated development environment, and wherein said at least one executable code snippet selected is automatically invoked to correct said semantic errors identified for said node chosen.

2. The method according to claim 1, wherein said at least one executable code snippet comprises a primary executable code snippet and a secondary executable code snippet, and wherein the method further comprises:
executing the primary executable code snippet; and
in response to the primary executable code snippet failing to correct said semantic errors identified for said node chosen, automatically executing the secondary executable code snippet.

3. The method according to claim 1, further comprising:
providing a collaboration datastore for storing said one or more collaboration records containing respective invocations for identifying said one or more nodes containing said semantic errors, wherein a collaboration record includes one or more properties, and wherein a respective invocation of said respective invocations includes a type of invocation and one or more parameters.

4. The method according to claim 1, wherein said identifying further comprises:
creating, using said one or more collaboration records located, visual indicators within said code editor for said one or more nodes containing said semantic errors identified.

5. The method according to claim 1, wherein said selecting further comprises:
providing an executable code snippet processor for maintaining said one or more executable code snippets associated with said one or more collaboration records located for said node chosen; and
configuring one or more parameters for said at least one executable code snippet selected for said node chosen, wherein said one or more parameters comprises at least one of: input parameters, output parameters, input-output parameters, return values and execution order values.

6. The method according to claim 5, wherein said executing further comprises:
ascertaining whether or not said at least one executable code snippet selected for said node chosen is configured to correct said semantic errors contained within said node;
if said at least one executable code snippet selected for said node is configured to correct said semantic errors contained within said node, fetching said at least one executable code snippet from said executable code snippet processor; and
executing said at least one executable code snippet fetched only upon detecting said semantic errors during execution of said one or more nodes identified in said syntax tree, wherein said one or more nodes identified in said syntax tree comprise a first node and a subsequently-executing second node, wherein the semantic errors occur in the first node, and wherein said at least one executable code snippet is executed in the subsequently-executing second node.

7. The method according to claim 6, further comprising:
   determining whether said execution of said at least one executable code snippet selected is successful in correcting said semantic errors identified; and
   in response to said execution of said at least one executable code snippet selected not being successful in correcting said semantic errors identified, selecting another executable code snippet from said one or more executable code snippets displayed for correcting said semantic errors identified for said node chosen; and
   executing said code inputted in said integrated development environment, wherein said another executable code snippet selected is automatically invoked to correct said semantic errors identified for said node chosen.

8. A computer system for correcting semantic errors in code in an integrated development environment, said computer system comprising:
   a central processing unit, a computer readable memory, and a computer readable storage media;
   first program instructions to input code being developed in an integrated development environment, said first program instructions including instructions to construct, using a code parser, a syntax tree representation of said code inputted and to parse said code inputted and to identify one or more nodes, from said syntax tree representation, which contain semantic errors pertaining to use of a third-party library in said code inputted;
   second program instructions to display, using one or more matching collaboration records located for a node chosen from said one or more nodes identified containing said semantic errors, multiple suggestions for correcting said semantic errors identified in said syntax tree representation constructed for said code inputted, wherein each of said multiple suggestions include one or more code snippets associated with one or more collaboration records located for said node chosen, and wherein said one or more code snippets are submitted by peer developers to correct said semantic errors identified for said node chosen;
   third program instructions to execute said code inputted in said integrated development environment, wherein at least one code snippet selected from said one or more code snippets is automatically invoked to correct said semantic errors identified for said node chosen; and
   fourth program instructions to display a code snippet configuration interface for configuring said one or more code snippets, wherein the code snippet configuration interface comprises:
      an input parameter active field for identifying input parameters that are required, by said node chosen, to be used with said one or more code snippets;
      an output parameter active field for identifying output parameters that are required, by said node chosen, to be used with said one or more code snippets;
      an input/output parameter active field for identifying input/output parameters that are required, by said node chosen, to be used with said one or more code snippets; and
      a return value active field for identifying a return value that is required, by said node chosen, to be returned by said one or more code snippets;
   and wherein said first, second, third, and fourth program instructions are stored on said computer readable storage media in said computer system for execution by said central processing unit via said computer readable memory.

9. The computer system according to claim 8, wherein said second program instructions further comprise instructions to provide a collaboration datastore for storing one or more collaboration records containing respective invocations for identifying said one or more nodes containing said semantic errors, wherein a collaboration record includes one or more properties, and wherein a respective invocation of said respective invocations includes a type of invocation and one or more parameters, and wherein said second program instructions further comprise instructions to provide a code snippet processor for maintaining said one or more code snippets associated with said one or more collaboration records located for said node chosen.

10. The computer system according to claim 8, wherein said second program instructions further comprise instructions to create semantic error markers within a code editor for identifying said one or more nodes containing said semantic errors.

11. The computer system according to claim 8, wherein said third program instructions further comprise instructions to choose said node from said one or more nodes identified containing said semantic errors and to configure one or more parameters for said at least one code snippet selected for said node chosen, wherein said one or more parameters comprises at least one of: input parameters, output parameters, input-output parameters, return values and execution order values.

12. The computer system according to claim 9, wherein said third program instructions further comprise instructions to ascertain whether or not said at least one code snippet selected for said node chosen is configured to correct said semantic errors contained within said node, and if said at least one code snippet selected for said node is configured to correct said semantic errors contained within said node, said third program instructions further comprise instructions to fetch said at least one code snippet from said code snippet processor and to execute said at least one code snippet fetched based on said type of invocation and said one or more parameters configured for said code snippet selected, wherein said type of invocation includes an execution order value comprising at least one of: before invocation, after invocation and only upon error.

13. A computer program product for correcting semantic errors in code in an integrated development environment, said computer program product comprising:
   a non-transitory computer readable medium;
      first program instructions to receive code being developed by a developer in an integrated development environment, said first program instructions including instructions to construct, using a code parser, a syntax tree representation of said code inputted and to parse said code inputted and to identify one or more nodes, from said syntax tree representation, which contain semantic errors pertaining to use of a third-party library in said code inputted;
      second program instructions to display, using one or more matching collaboration records located for a node chosen from said one or more nodes identified containing said semantic errors, multiple suggestions for correcting said semantic errors identified in said syntax tree constructed for said code inputted, wherein each of said multiple suggestions include one or more code snippets associated with one or more collaboration records located for said node chosen, and wherein said one or more code snippets are submitted by peer developers to correct said semantic errors identified for said node chosen;
      third program instructions to execute said code inputted in said integrated development environment, wherein at least one code snippet selected from said one or more code snippets is automatically invoked to correct said semantic errors identified for said node chosen; and fourth program instructions to display a code snippet configuration interface for configuring said one or more code snippets, wherein the code snippet configuration interface comprises:
- an input parameter active field for identifying input parameters that are required, by said node chosen, to be used with said one or more code snippets;
- an output parameter active field for identifying output parameters that are required, by said node chosen, to be used with said one or more code snippets;
- an input/output parameter active field for identifying input/output parameters that are required, by said node chosen, to be used with said one or more code snippets; and
- a return value active field for identifying a return value that is required, by said node chosen, to be returned by said one or more code snippets;

and wherein said first, second, third, and fourth program instructions are stored on said computer readable storage media.

14. The computer program product according to claim 13, wherein said second program instructions further comprise instructions to provide a collaboration datastore for storing one or more collaboration records containing respective invocations for identifying said one or more nodes containing said semantic errors, wherein a collaboration record includes one or more properties, and wherein a respective invocation of said respective invocations includes a type of invocation and one or more parameters, and wherein said second program instructions further comprise instructions to provide a code snippet processor for maintaining said one or more code snippets associated with said one or more collaboration records located for said node chosen.

15. The computer program product according to claim 13, wherein said second program instructions further comprise instructions to create semantic error markers within a code editor for said semantic errors identified using said one or more collaboration records located, said second program instructions further comprise instructions to create, using said one or more collaboration records located, visual indicators within said code editor for said one or more nodes containing said semantic errors identified.

16. The computer program product according to claim 13, wherein said third program instructions further comprise instructions to choose said node from said one or more nodes identified containing said semantic errors and to configure one or more parameters for said at least one code snippet selected for said node chosen, wherein said one or more parameters comprises at least one of: input parameters, output parameters, input-output parameters, return values and execution order values.

17. The computer program product according to claim 14, wherein said third program instructions further comprise instructions to ascertain whether or not said at least one code snippet selected for said node chosen is configured to correct said semantic errors contained within said node and if said at least one code snippet selected for said node is configured to correct said semantic errors contained within said node, said third program instructions include instructions to fetch said at least one code snippet from said code snippet processor and to execute said at least one code snippet fetched based on said type of invocation and said one or more parameters configured for said code snippet selected, wherein said type of invocation includes an execution order value comprising at least one of: before invocation, after invocation and only upon error.

18. The computer program product according to claim 13, wherein said third program instructions further comprise instructions to determine whether said execution of said at least one code snippet selected is successful in correcting said semantic errors identified and, if said execution of said at least one code snippet selected is not successful in correcting said semantic errors identified, said third program instructions further comprise instructions to select another code snippet from said one or more code snippets displayed for correcting said semantic errors identified for said node chosen and to execute said code inputted in said integrated development environment, wherein said another code snippet selected is automatically invoked to correct said semantic errors identified for said node chosen.

19. A process for deploying computing infrastructure comprising integrating computer-readable code into a computing system, wherein said computer-readable code in combination with said computing system is capable of performing a process of correcting semantic errors in code in an integrated development environment, said process comprising:
- inputting, using a code editor, code being developed by a developer in an integrated development environment;
- constructing, using a code parser, a syntax tree representation of said code inputted;
- identifying, in said syntax tree representation constructed for said code inputted, one or more nodes containing semantic errors pertaining to use of a third-party library;
- choosing a node of said one or more nodes identified in said syntax tree representation constructed containing said semantic errors;
- displaying multiple suggestions for correcting said semantic errors identified for said node chosen, wherein each of said multiple suggestions include one or more code snippets associated with one or more collaboration records located for said node chosen, and wherein said one or more code snippets are submitted by peer developers to correct said semantic errors identified for said node chosen;
- displaying a code snippet configuration interface for configuring said one or more code snippets, wherein the code snippet configuration interface comprises:
  - an input parameter active field for identifying input parameters that are required, by said node chosen, to be used with said one or more code snippets;
  - an output parameter active field for identifying output parameters that are required, by said node chosen, to be used with said one or more code snippets;
  - an input/output parameter active field for identifying input/output parameters that are required, by said node chosen, to be used with said one or more code snippets; and
  - a return value active field for identifying a return value that is required, by said node chosen, to be returned by said one or more code snippets;
- selecting at least one code snippet from said one or more code snippets displayed for correcting said semantic errors identified for said node chosen; and
- executing said code inputted in said integrated development environment, wherein said at least one code snippet selected is automatically invoked to correct said semantic errors identified for said node chosen.

20. The process according to claim 19, further comprising:
providing a collaboration datastore for storing said one or more collaboration records containing respective invocations for identifying said one or more nodes containing said semantic errors, wherein a collaboration record includes one or more properties, and wherein a respective invocation of said respective invocations includes a type of invocation and one or more parameters.

21. The process according to claim 19, wherein said identifying further comprises:
   creating, using said one or more collaboration records located, visual indicators within said code editor for said one or more nodes containing said semantic errors identified.

22. The process according to claim 19, wherein said displaying further comprises:
   ascertaining whether or not said developer wishes to apply a suggestion of said one or more suggestions displayed for said node; and
   if said developer wishes to apply said suggestion of said one or more suggestions displayed for said node, applying said suggestion to said node to correct said semantic errors identified.

23. The process according to claim 19, wherein said identifying further comprises:
   ascertaining whether or not said at least one code snippet selected for said node chosen is configured to correct said semantic errors contained within said node;
   if said at least one code snippet selected for said node is configured to correct said semantic errors contained within said node, fetching said at least one code snippet from a code snippet processor; and
   executing said at least one code snippet fetched based on said type of invocation and said one or more parameters configured for said code snippet selected, wherein said type of invocation includes an execution order value comprising at least one of: before invocation, after invocation and only upon error.

24. The process according to claim 19, wherein said executing further comprises:
   determining whether said execution of said at least one code snippet selected is successful in correcting said semantic errors identified;
   if said execution of said at least one code snippet selected is not successful in correcting said semantic errors identified, selecting another code snippet from said one or more code snippets displayed for correcting said semantic errors identified for said node chosen; and
   executing said code inputted in said integrated development environment, wherein said another code snippet selected is automatically invoked to correct said semantic errors identified for said node chosen.

\* \* \* \* \*